United States Patent
Parrott

(10) Patent No.: US 9,710,939 B2
(45) Date of Patent: Jul. 18, 2017

(54) VIDEO OUTPUT DEVICE, VIDEO OUTPUT METHOD, AND NON-TRANSITORY COMPUTER READABLE RECORDING MEDIUM

(71) Applicant: GREE, INC., Tokyo (JP)

(72) Inventor: Jason Edward Parrott, Tokyo (JP)

(73) Assignee: GREE, INC., Tokyo (JP)

( * ) Notice: Subject to any disclaimer, the term of this patent is extended or adjusted under 35 U.S.C. 154(b) by 174 days.

(21) Appl. No.: 14/271,776

(22) Filed: May 7, 2014

(65) Prior Publication Data

US 2014/0333631 A1  Nov. 13, 2014

(30) Foreign Application Priority Data

May 8, 2013 (JP) ................................ 2013-098291

(51) Int. Cl.
*G06T 11/20* (2006.01)

(52) U.S. Cl.
CPC ................................ *G06T 11/203* (2013.01)

(58) Field of Classification Search
CPC . H04L 12/5825; H04L 12/5895; H04L 51/04; H04L 51/063; H04L 51/066; H04L 51/10; G06T 11/203; G06T 1/20; G06T 11/60; G06T 13/80; G09G 2340/125; G09G 5/36; G09G 2340/12; G09G 5/12; H04N 19/61; H04N 5/2624; G06F 15/16
See application file for complete search history.

(56) References Cited

U.S. PATENT DOCUMENTS

| | | | | |
|---|---|---|---|---|
| 2003/0054882 A1* | 3/2003 | Suzuki | ..................... | G06K 9/46 463/30 |
| 2003/0117485 A1* | 6/2003 | Mochizuki | .............. | G06T 13/40 348/14.01 |
| 2008/0278761 A1* | 11/2008 | Tanisaka | .............. | H04N 1/4092 358/3.06 |
| 2010/0002014 A1* | 1/2010 | Sakamoto et al. | ............ | 345/629 |
| 2013/0027404 A1* | 1/2013 | Sarnoff | ......................... | 345/441 |

FOREIGN PATENT DOCUMENTS

| | | |
|---|---|---|
| JP | A-10-171722 | 6/1998 |
| JP | 2003-037826 A | 2/2003 |
| JP | 2011186573 A | 9/2011 |

(Continued)

OTHER PUBLICATIONS

Aug. 19, 2014 Office Action issued in Japanese Application No. 2013-098291 (with translation).

(Continued)

*Primary Examiner* — James A Thompson
*Assistant Examiner* — Xilin Guo
(74) *Attorney, Agent, or Firm* — Oliff PLC

(57) ABSTRACT

A storage unit (12) stores first drawing data shared in common by at least two video frames among a plurality of video frames. A control unit (13) generates second drawing data based on second drawing instruction data (122) for drawing a portion that differs in drawing data pertaining to the plurality of video frames and generates the drawing data pertaining to the plurality of video frames by combining the first drawing data and the second drawing data. An output unit (14) outputs video based on the drawing data pertaining to the plurality of video frames.

15 Claims, 9 Drawing Sheets

(56) References Cited

FOREIGN PATENT DOCUMENTS

JP         2013-037447 A      2/2013
JP         A-2013-037447      2/2013

OTHER PUBLICATIONS

Kaneko et al. "Sign Language Animation Synchronized with TV Program Using WebGL-based Viewer," *The Institute of Electronics, Information and Communication* Engineers, Jan. 26, 2013, pp. 25-28, vol. 112, No. 426 I (with Abstract).
Nov. 25, 2014 Office Action issued in Japanese Patent Application No. 2013-098291.
Mar. 24, 2015 Official Decision of Refusal issued in Japanese Application No. 2013-098291.
Mar. 24, 2015 Decision to Dismiss the Amendment issued in Japanese Application No. 2013-098291.
Nov. 29, 2016 Office Action issued in Japanese Patent Application No. 2015-119572.
Kujira Hikou-zukue; "Let's create smartphone applications with HTML5, the second, Drawing games can be created by using Canvas;" Nikkei Software; Japan; Nikkei Business Publications, Inc.; Dec. 24, 2011; vol. 15; No. 2; pp. 38-103.
Sep. 6, 2016 Office Action issued in Japanese Patent Application No. 2015-119572.
Kujira Hikou-zukue, "Let's create smartphone applications with HTML5, the second, Drawing games can be created by using Canvas", Nikkei Software, Japan, Nikkei Business Publications, Inc., Dec. 24, 2011, vol. IS, No. 2, pp. 98-103.

\* cited by examiner

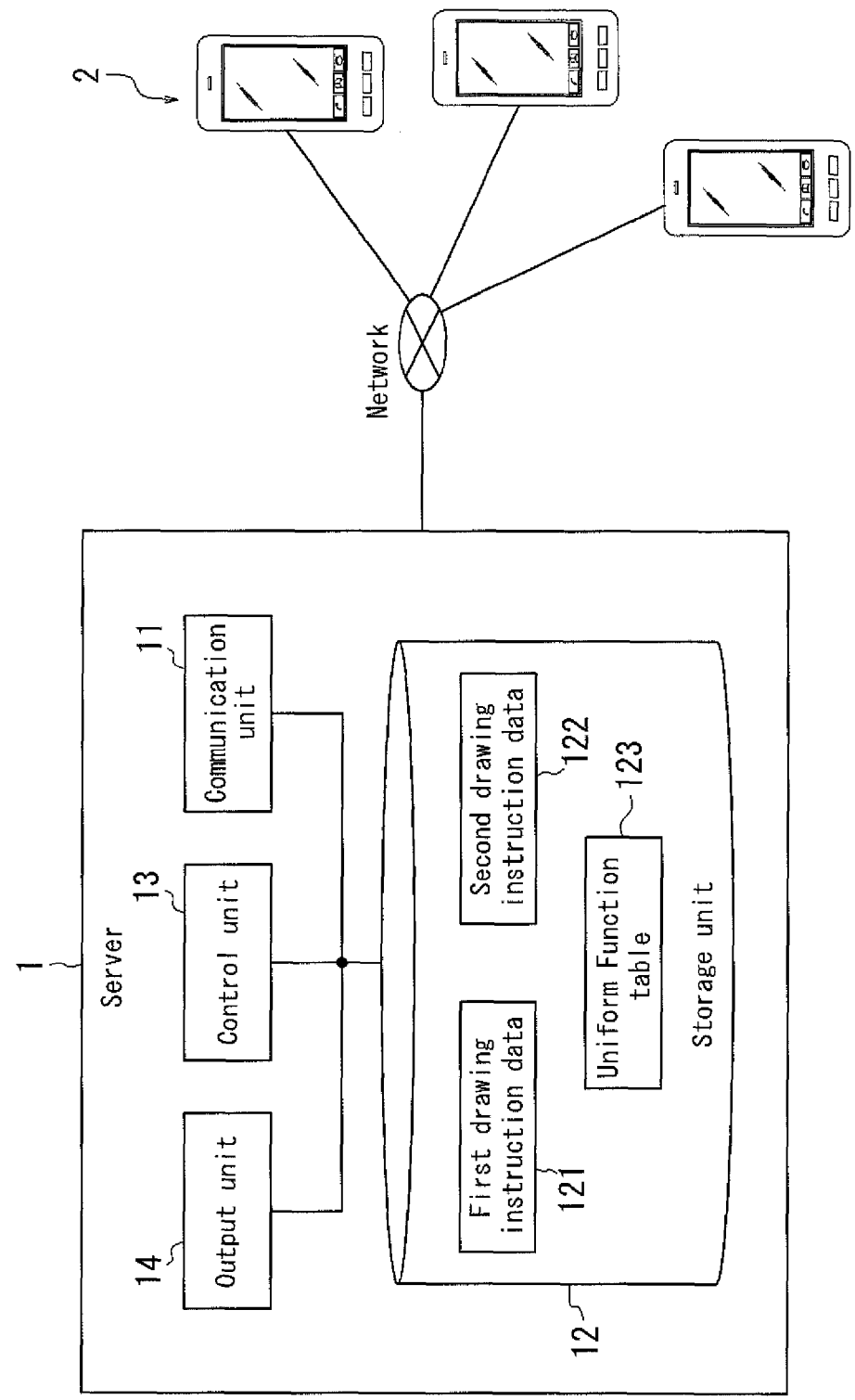

FIG. 3

| Identifier (int) | Time (Y:m:d) | Type (canvas) | X | Y | CPX | CPY | r |
|---|---|---|---|---|---|---|---|
| 1 | 2013:04:10 11:00 | Moveto | 20 | 20 | — | — | — |
| 2 | 2013:04:10 11:01 | quadraticCurveTo | 120 | 20 | 70 | −20 | — |
| 3 | 2013:04:10 11:02 | quadraticCurveTo | 120 | 120 | 160 | 70 | — |
| 4 | 2013:04:10 11:03 | quadraticCurveTo | 20 | 120 | 70 | 160 | — |
| 5 | 2013:04:10 11:03 | quadraticCurveTo | 20 | 20 | −20 | 70 | — |
| 6 | 2013:04:10 11:04 | arc | 30 | 110 | — | — | 5 |
| 7 | 2013:04:10 11:05 | arc | 110 | 110 | — | — | 5 |
| ... | ... | ... | ... | ... | ... | ... | ... |

FIG. 4

| Identifier (int) | Time (Y:m:d) | Type (canvas) | X | Y | CPX | CPY | r |
|---|---|---|---|---|---|---|---|
| 8 | 2013:04:10 11:06 | Moveto | 30 | 30 | — | — | — |
| 9 | 2013:04:10 11:07 | quadraticCurveTo | 30 | 110 | 70 | $uniform | — |
| ... | ... | ... | ... | ... | ... | ... | ... |

FIG. 5

| Video frame number | $uniform |
|---|---|
| 1 | 70 |
| 2 | −10 |
| ... | ... |

FIG. 9

JavaScript (Canvas)

```
Line number
  1   onload = function() {
  2     draw();
  3   };
  4
  5   function draw() {
  6
  7     /* Node object of canvas element*/
  8     var canvas =
  9   document.getElementById('canvassample');
 10
 11     /*Check for existence of canvas element and deal with browsers not supporting Canvas*/
 12     if ( ! canvas || ! canvas.getContext ) {
 13       return false;
 14     }
 15
 16     /* 2D context */
 17     var ctx = canvas.getContext('2d');
 18
 19     /* Draw face*/
 20     ctx.beginPath();
 21     ctx.moveTo(20, 20);
 22     ctx.quadraticCurveTo(120,  20, 70,-20);
 23     ctx.quadraticCurveTo (120,120, 160, 70);
 24     ctx.quadraticCurveTo ( 20,120, 70,160);
 25     ctx.quadraticCurveTo ( 20, 20, -20, 70);
 26     ctx.closePath();
 27     ctx.stroke();
 28
 29     /* Draw eyes and (angry) mouth */
 30     ctx.beginPath();
 31     ctx.arc(30, 110, 5, 0, Math.PI*2, false);
 32     ctx.arc(110, 110, 5, 0, Math.PI*2, false);
 33     ctx.moveTo (30, 30) ;
 34     ctx.quadraticCurveTo ( 30,110, 70, 70);
 35     ctx.closePath();
 36     ctx.stroke();
     }
```

FIG. 10

JavaScript (Canvas)

```
 1  onload = function() {
 2    draw();
 3  };
 4
 5  function draw() {
 6
 7    /* Node object of canvas element */
 8    var canvas =
 9  document.getElementById('canvassample');
10
11    /* Check for existence of canvas element and deal with browsers not supporting Canvas */
12    if ( ! canvas || ! canvas.getContext ) {
13      return false;
14    }
15
16    /* 2D context */
17    var ctx = canvas.getContext('2d');
18
19    /* Draw face*/
20    ctx.beginPath();
21    ctx.moveTo(20, 20);
22    ctx.quadraticCurveTo(120, 20, 70,-20);
23    ctx.quadraticCurveTo (120,120,160, 70);
24    ctx.quadraticCurveTo (20,120, 70, 160);
25    ctx.quadraticCurveTo (20, 20, -20, 70,);
26    ctx.closePath();
27    ctx.stroke();
28
29    /* Draw eyes and (smiling) mouth */
30    ctx.beginPath();
31    ctx.arc(30, 110, 5, 0, Math.PI*2, false);
32    ctx.arc(110, 110, 5, 0, Math.PI*2, false);
33    ctx.moveTo (30, 30) ;
34    ctx.quadraticCurveTo (30,110, 70, -10);
35    ctx.closePath();
36    ctx.stroke();
    }
```

Line number (left column)

VIDEO OUTPUT DEVICE, VIDEO OUTPUT METHOD, AND NON-TRANSITORY COMPUTER READABLE RECORDING MEDIUM

CROSS-REFERENCE TO RELATED APPLICATION

This application claims priority to and the benefit of Japanese Patent Application No. 2013-098291 filed May 8, 2013, the entire contents of which are incorporated herein by reference.

TECHNICAL FIELD

The present invention relates to a video output device, a video output method, and a non-transitory computer readable recording medium.

BACKGROUND ART

In recent years, the Canvas function in JavaScript (registered trademark) is being used as a method for displaying video on a client terminal in a server-client environment (for example, see Patent Literature 1). In Canvas, line segments, arcs, circles, curved lines, and the like are designated with predetermined drawing commands, and video is displayed on the client terminal by displaying drawing data at a predetermined frame rate.

FIGS. 7 and 8 show video frames for a video in which drawing data, drawn with a conventional method, change from an "angry face" (FIG. 7) to a "smiling face" (FIG. 8). Conventionally, the drawing data illustrated in FIG. 7 are drawn with code using the Canvas function as illustrated in FIG. 9. Specifically, line 21 of FIG. 9, "ctx.moveTo(20,20)", designates point P1 in FIG. 7. Next, line 22 of FIG. 9, "ctx.quadraticCurveTo(120,20,70,−20)", designates a curved line with point P1 as the starting point and point P2 as the ending point in FIG. 7. Line 23, "etx.quadratieCurveTo(120,120,160,70)", designates a curved line with point P2 as the starting point and point P3 as the ending point in FIG. 7. Line 24, "ctx.quadraticCurveTo(20,120,70,160)", designates a curved line with point P3 as the starting point and point P4 as the ending point. Furthermore, line 25, "ctx.quadraticCurveTo(20,20,−20,70)", designates a curved line with point P4 as the starting point and point P1 as the ending point in FIG. 7. In this way, the outline of the face in FIG. 7 is designated by lines 21 through 25 in FIG. 9.

Line 31 of FIG. 9, "ctx.arc(30,110,5,0,Math.PI*2,false)", designates a circle with a radius of 5, with point P5 in FIG. 7 as the center. Line 32, "ctx.arc(110,110,5,0,Math.PI*2, false)", designates a circle with a radius of 5, with point P6 in FIG. 7 as the center. Next, line 33, "ctx.moveTo(30,30)" designates point P7 in FIG. 7. Line 34, "ctx.quadraticCurveTo(30,110,70,70)", then designates a curved line with point P7 as the starting point and point P8 as the ending point in FIG. 7. Lines 31 to 34 thus designate eyes and an angry mouth. The above processing generates the drawing data illustrated in FIG. 7.

The drawing data in FIG. 8 are generated based on the code in FIG. 10. Specifically, line 21 of FIG. 10, "ctx.moveTo(20,20)", designates point P1 in FIG. 8. Line 22, "ctx.quadraticCurveTo(120,20,70,−20)", then designates a curved line with point P1 as the starting point and point P2 as the ending point in FIG. 8. Line 23, "ctx.quadraticCurveTo(120,120,160,70)", designates a curved line with point P2 as the starting point and point P3 as the ending point in FIG. 8. Line 24, "ctx.quadraticCurveTo(20,120,70,160)", designates a curved line with point P3 as the starting point and point P4 as the ending point in FIG. 8. Furthermore, line 25, "ctx.quadraticCurveTo(20,20,−20,70)", designates a curved line with point P4 as the starting point and point P1 as the ending point in FIG. 8. In this way, the outline of the face in FIG. 8 is designated by lines 21 through 25 in FIG. 10.

Line 31 of FIG. 10, "ctx.arc(30,110,5,0,Math.PI*2,false)", designates a circle with a radius of 5, with point P5 in FIG. 8 as the center. Line 32, "etx.arc(110,110,5,0,Math.PI*2,false)", designates a circle with a radius of 5, with point P6 in FIG. 8 as the center. Next, line 33, "ctx.moveTo(30,30)" designates point P7 in FIG. 8. Line 34, "ctx.quadraticCurveTo(30,110,70,−10)", then designates a curved line with point P7 as the starting point and point P8 as the ending point in FIG. 8. Lines 31 to 34 thus designate and draw the eyes and smiling mouth in FIG. 8. The above processing generates the drawing data illustrated in FIG. 8. Video is displayed by displaying FIGS. 7 and 8 at predetermined time intervals (frame rate).

CITATION LIST

Patent Literature

Patent Literature 1: JP 2013-37447 A

SUMMARY OF INVENTION

Technical Problem

With a conventional video output method, drawing instruction data corresponding to each video frame are consecutively calculated and the drawing data corresponding to each video frame are created in order to output video. There is a desire, however, to speed up video output.

The present invention has been conceived in light of these circumstances and provides a video output device, video output method, and a non-transitory computer readable recording medium that can speed up video output.

Solution to Problem

A video output device according to an aspect of the present invention includes a storage unit configured to store first drawing data shared in common by at least two video frames among a plurality of video frames; a control unit configured to generate second drawing data based on second drawing instruction data for drawing a portion that differs in drawing data pertaining to the plurality of video frames and to generate the drawing data pertaining to the plurality of video frames by combining the first drawing data and the second drawing data; and an output unit configured to output video based on the drawing data pertaining to the plurality of video frames.

In the video output device according to an aspect of the present invention, the control unit may generate the first drawing data based on first drawing instruction data.

In the video output device according to an aspect of the present invention, the first drawing instruction data and the second drawing instruction data may be data based on Canvas specifications.

A video output method according to an aspect of the present invention includes the steps of: storing first drawing data shared in common by at least two video frames among a plurality of video frames; generating second drawing data based on second drawing instruction data for drawing a portion that differs in drawing data pertaining to the plurality of video frames and generating the drawing data pertaining to the plurality of video frames by combining the first drawing data and the second drawing data; and outputting video based on the drawing data pertaining to the plurality of video frames.

In the video output method according to an aspect of the present invention, the first drawing data may be generated based on first drawing instruction data.

In the video output method according to an aspect of the present invention, the first drawing instruction data and the second drawing instruction data may be data based on Canvas specifications.

A non-transitory computer readable recording medium according to an aspect of the present invention has stored thereon instructions for causing a computer to function as a video output device that outputs video, the instructions causing the computer to execute the steps of: storing first drawing data shared in common by at least two video frames among a plurality of video frames; generating second drawing data based on second drawing instruction data for drawing a portion that differs in drawing data pertaining to the plurality of video frames and generating the drawing data pertaining to the plurality of video frames by combining the first drawing data and the second drawing data; and outputting video based on the drawing data pertaining to the plurality of video frames.

In the non-transitory computer readable recording medium according to an aspect of the present invention, the first drawing data may be generated based on first drawing instruction data.

In the non-transitory computer readable recording medium according to an aspect of the present invention, the first drawing instruction data and the second drawing instruction data may be data based on Canvas specifications.

Advantageous Effect of Invention

The video output device, video output method, and non-transitory computer readable recording medium according to aspects of the present invention allow for speeding up of video output.

BRIEF DESCRIPTION OF DRAWINGS

The present invention will be further described below with reference to the accompanying drawings, wherein:

FIG. 1 is a block diagram of a video output system according to an embodiment of the present invention;

FIG. 3 illustrates an example of first drawing instruction data;

FIG. 4 illustrates an example of second drawing instruction data;

FIG. 5 illustrates an example of a Uniform Function table;

FIG. 9 is code for generating the drawing data of FIG. 7 with a conventional technique; and FIG. 10 is code for generating the drawing data of FIG. 8 with a conventional technique.

DESCRIPTION OF EMBODIMENTS

Figure 2A:
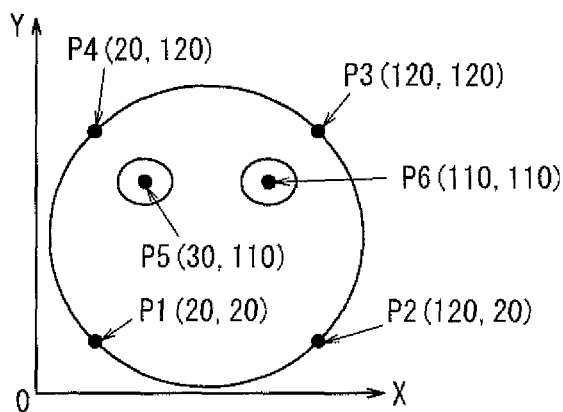
FIGS. 2A through 2E schematically illustrate drawing data for video frames in a video output device according to an embodiment of the present invention.

The following describes an embodiment of the present invention.

Embodiment

FIG. 1 is a block diagram of a video output system that includes a video output device 1 according to an embodiment of the present invention. The video output system illustrated in FIG. 1 includes a video output device (server) 1 and client terminals 2. The video output device 1 includes a communication unit 11, a storage unit 12, a control unit 13, and an output unit 14. Each client terminal 2 is a communication terminal such as a cellular telephone, smartphone, PC, or the like. While three client terminals 2 are illustrated in the example in FIG. 1, the number is not limited to three and may be either less than or greater than three.

The communication unit 11 of the video output device 1 communicates with the client terminal 2 over a network via a connection that is either wired or wireless, or both. Specifically, the communication unit 11 receives a request for video transmission from the client terminal 2. The communication unit 11 also transmits video data, output by the output unit 14, to the client terminal 2.

The storage unit 12 stores a variety of information necessary for the video output system. The control unit 13 performs a variety of control related to the video output device 1.

Overall, the control unit 13 generates data (referred to below as first drawing data) in advance pertaining to a drawing portion shared in common by at least two video frames among a plurality of video frames and stores the first drawing data in the storage unit 12. The control unit 13 generates data (referred to below as second drawing data) pertaining to a drawing portion not shared in common with other video frames among the plurality of video frames, i.e. a drawing portion that differs, and generates drawing data pertaining to the plurality of video frames by combining the first drawing data and the second drawing data.

Figure 2B:
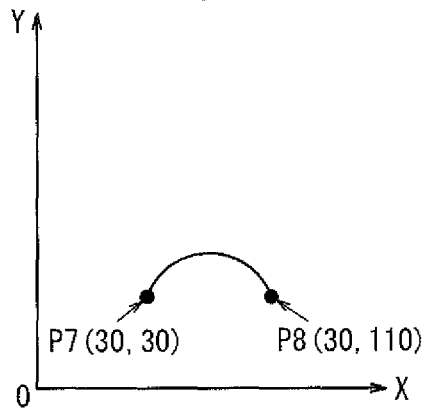
Figure 2C:
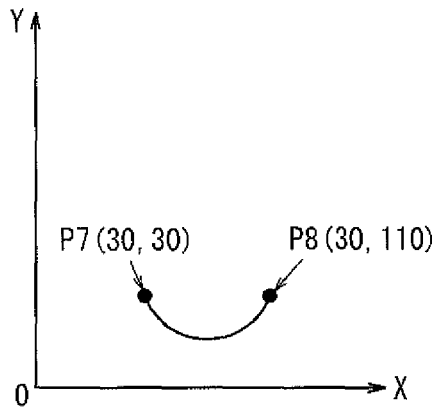
Figure 2D:
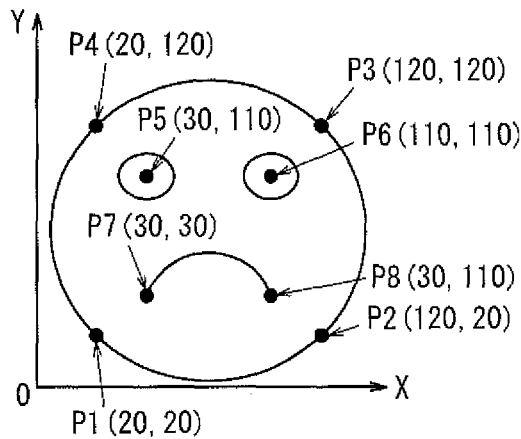
Figure 2E:
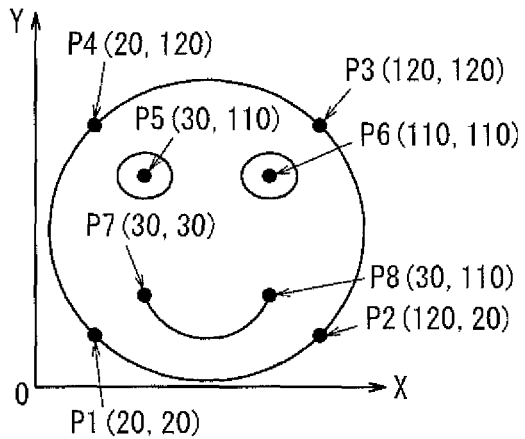

FIGS. 2A through 2E schematically illustrate generation of video frames by the video output device 1 according to the embodiment of the present invention. FIGS. 2A through 2E illustrate the steps for generating video frames pertaining to drawing data for an "angry face" (FIG. 2D) and a "smiling face" (FIG. 2E). FIG. 2A illustrates the first drawing data. The portion for the eyes and the outline of the face, shared in common between the "smiling face" and the "angry face", becomes the first drawing data. FIGS. 2B and 2C illustrate the second drawing data. As illustrated in FIGS. 2B and 2C, the portion for the mouth, which differs between the "angry face" and the "smiling face", becomes the second drawing data.

Combining the first drawing data in FIG. 2A and the second drawing data in FIG. 2B generates the drawing data for the "angry face" (FIG. 2D), and combining the first drawing data in FIG. 2A and the second drawing data in FIG. 2C generates the drawing data for the "smiling face" (FIG. 2E).

The following describes the information stored in the storage unit 12 and the control by the control unit 13 in detail.

The storage unit 12 stores first drawing instruction data 121, second drawing instruction data 122, and a Uniform Function table 123.

The first drawing instruction data 121 are data for drawing the first drawing data and specifically are data that include a variety of parameters and the like for drawing line segments, arcs, curved lines, and the like. The first drawing data are preferably data based on Canvas specifications. Hereinafter in the present embodiment, the first drawing data are described as being data based on Canvas specifications, and the video output device 1 is described as including an environment that can use the functions of Canvas, such as a web server (Apache or the like), a Javascript (registered trademark) library (jQuery), or the like. FIG. 3 illustrates an example of the first drawing instruction data 121. For each drawing command, the first drawing instruction data 121 store the values of an identifier, time, type, X, Y, CPX, CPY, and r in association. Here, the identifier is an identification number for uniquely specifying each drawing command. The time indicates the time that the drawing command was stored. The type indicates the type of drawing command. Specifically, the type is Moveto (the starting point of a line segment or curved line), Lineto (the ending point of a line segment), arc, quadraticCurveTo (curved line), or the like. X, Y, CPX, CPY, and r are parameters for each drawing command. X and Y are the coordinates of the starting point and the ending point for Moveto, Lineto, and quadraticCurveTo, or the coordinates of the center point or the like for arc. CPX and CPY indicate the coordinates of the control point for quadraticCurveTo, and r indicates the radius for arc.

For example, the first drawing instruction data 121 include the following values: identifier "1", time "2013:04:10 11:00", type "Moveto", X "20", Y "20", CPX "–", CPY "–", and r "–". These values designate point P1 in FIG. 2A. The first drawing instruction data 121 also include the following values: identifier "2", time "2013:04:10 11:01", type "quadraticCurveto", X "120", Y "20", CPX "70", CPY "–20", and r "–". These values designate a curved line with point P1 as the starting point and point P2 as the ending point in FIG. 2A. Similarly, the data for identifiers 3 through 7 designate a curved line with point P2 as the starting point and point P3 as the ending point, a curved line with point P3 as the starting point and point P4 as the ending point, a curved line with point P4 as the starting point and point P1 as the ending point, a circle with a radius of 5 centered on point P5, and a circle with a radius of 5 centered on point P6. In this way, the first drawing data illustrated in FIG. 2A are generated from the first drawing instruction data 121 illustrated in FIG. 3.

Specifically, upon receiving a request for video transmission from the client terminal 2 via the communication unit 11, the control unit 13 first reads the first drawing instruction data 121 in the storage unit 12 and generates the first drawing data. The control unit 13 then stores the first drawing data in the storage unit 12. The control unit 13 preferably stores the first drawing data in the storage unit 12 in a universal image format such as a bit map, JPEG, PNG, TiFF, or the like.

The second drawing instruction data 122 are data for drawing the second drawing data and specifically are data that include a variety of parameters and the like for drawing line segments, arcs, circles, curved lines, and the like. The second drawing data are preferably data based on Canvas specifications. Hereinafter, in the present embodiment, the second drawing data are described as being data based on Canvas specifications. FIG. 4 illustrates an example of the second drawing instruction data 122. For each drawing command, the second drawing instruction data 122 store the values of an identifier, time, type, X, Y, CPX, CPY, and r in association.

For example, the second drawing instruction data 122 include the following values: identifier "8", time "2013:04:10 11:06", type "Moveto", X "30", Y "30", CPX "–", CPY "–", and r "–". These values designate point P7 in FIG. 2B and FIG. 2C. The second drawing instruction data 122 also include the following values: identifier "9", time "2013:04:10 11:07", type "quadraticCurveTo", X "30", Y "110", CPX "70", CPY "$uniform", and r "–". These values designate a curved line with point P7 as the starting point and point P8 as the ending point in FIG. 2B and FIG. 2C.

The "$uniform" in the second drawing instruction data 122 is a variable storing a value that differs for each video frame. The Uniform Function table 123 stores the value of "$uniform" corresponding to each video frame.

Figure 5:
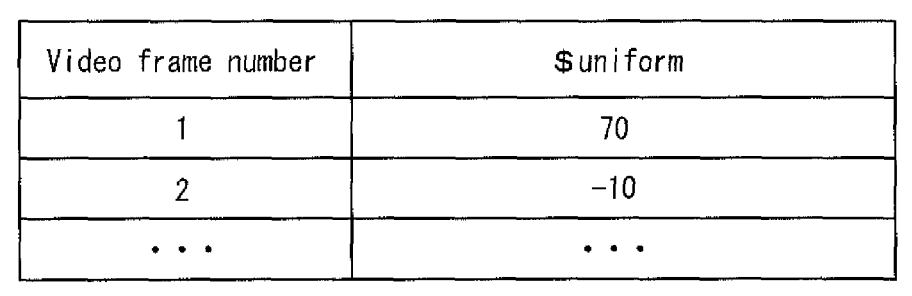

FIG. 5 illustrates an example of the Uniform Function table 123. The Uniform Function table 123 includes video frame numbers and the value of $uniform corresponding to each video frame number. The video frame number is a number for uniquely specifying a video frame in the present system. For example, video is generated by combining video frames in ascending order by video frame number. Accordingly, in the present system, the second drawing data illustrated in FIG. 2B and FIG. 2C are generated by the second drawing instruction data 122 illustrated in FIG. 4 and the Uniform Function table 123 illustrated in FIG. 5.

Specifically, the control unit 13 reads the second drawing instruction data 122 from the storage unit 12. The control unit 13 then reads the Uniform Function table 123 from the storage unit 12. Next, the control unit 13 determines the value of "$uniform" in the second drawing instruction data 122 for the frame number of each video frame based on the Uniform Function table 123. For example, for the video frame number "1", the control unit 13 determines that the value of "$uniform" is "70" based on the Uniform Function table 123. In this case, the control unit 13 then generates the second drawing data illustrated in FIG. 2B based on the second drawing instruction data 122. As another example, for the video frame number "2", the control unit 13 determines that the value of "$uniform" is "–10" based on the Uniform Function table 123. In this case, the control unit 13 then generates the second drawing data illustrated in FIG. 2C based on the second drawing instruction data 122.

The control unit 13 combines the first drawing data stored in the storage unit 12 with the generated second drawing data to generate drawing data pertaining to the plurality of video frames. Specifically, the control unit 13 combines the first drawing data (FIG. 2A) and the second drawing data illustrated in FIG. 2B to generate the drawing data in FIG. 2D. The control unit 13 also combines the first drawing data (FIG. 2A) and the second drawing data illustrated in FIG. 2C to generate the drawing data in FIG. 2E.

The output unit 14 then outputs video based on the drawing data pertaining to the plurality of video frames. Specifically, based on the drawing data pertaining to the plurality of video frames, the output unit 14 generates video data at a predetermined frame rate and transmits the video data to the client terminal 2 via the communication unit 11.

Figure 6:
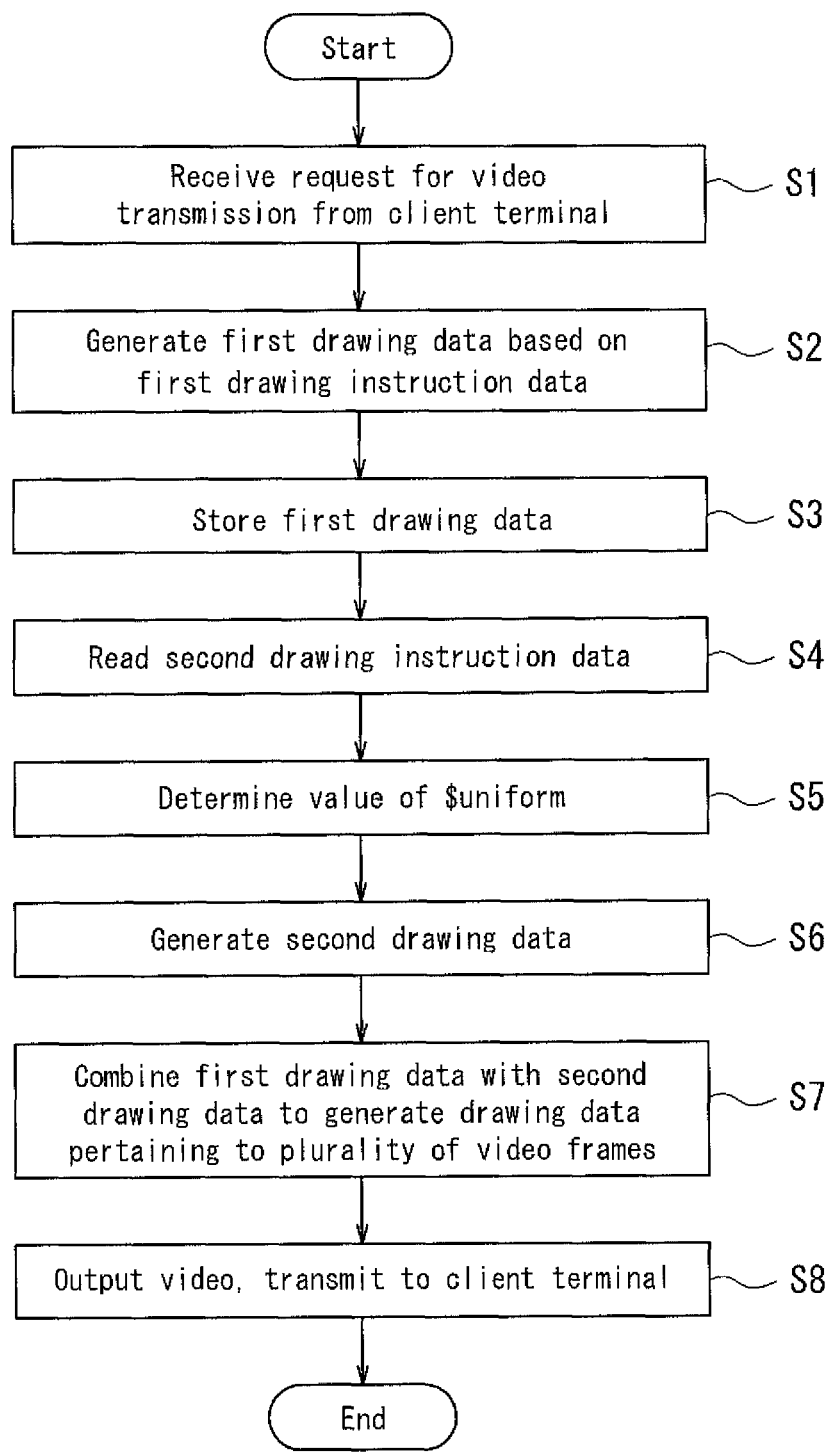
FIG. 6 is a flowchart illustrating operations by the video output device according to an embodiment of the present invention.
Figure 7:
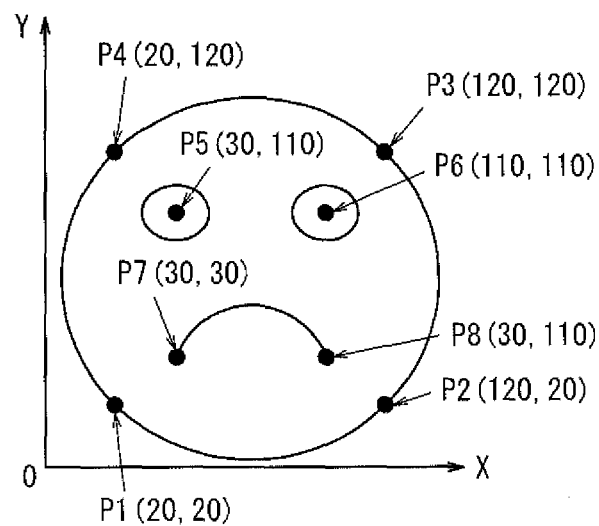
FIG. 7 illustrates drawing data for a video frame with a conventional technique.
Figure 8:
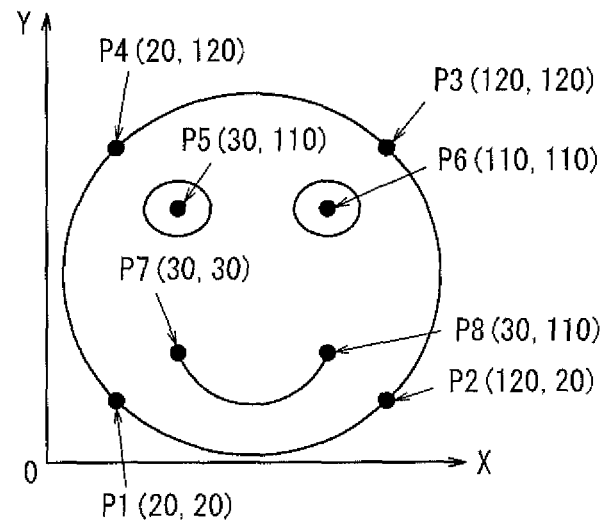
FIG. 8 illustrates drawing data for a different video frame than in FIG. 7 with a conventional technique.

Next, the operations of the video output device 1 according to an embodiment of the present invention are described using the flowchart in FIG. 6.

First, the communication unit 11 of the video output device 1 receives a request for video transmission from the client terminal 2 (step S1).

Next, the control unit 13 of the video output device 1 reads the first drawing instruction data 121 from the storage unit 12 and generates the first drawing data (step S2). The control unit 13 then stores the first drawing data in the storage unit 12 (step S3).

Next, the control unit 13 reads the second drawing instruction data 122 from the storage unit 12 (step S4). The control unit 13 then determines the value of "$uniform" in the second drawing instruction data 122 for the frame number of each video frame based on the Uniform Function table 123 (step S5). The control unit 13 then generates the second drawing data (step S6).

Next, the control unit 13 combines the first drawing data stored in the storage unit 12 with the generated second drawing data to generate drawing data pertaining to the plurality of video frames (step S7).

Next, the output unit 14 outputs video based on the drawing data pertaining to the plurality of video frames. Specifically, based on the drawing data pertaining to the plurality of video frames, the output unit 14 generates video data at a predetermined frame rate and transmits the video data to the client terminal 2 via the communication unit 11 (step S8). Processing then terminates.

According to this embodiment of the present invention, the control unit 13 generates first drawing data in advance pertaining to a drawing portion shared in common by at least two video frames among a plurality of video frames and stores the first drawing data in the storage unit 12. The control unit 13 then generates only a drawing portion that differs among the plurality of video frames and combines this drawing portion with the first drawing data, thus increasing the speed of processing for drawing the plurality of video frames and thereby speeding up video output.

In the present embodiment, an example of two video frames has been illustrated, yet the number of video frames is not limited in this way and may be three or more. In this case, the drawing portion shared in common by at least two video frames is treated as the first drawing data.

A computer is preferably used to function as the video output device 1. A program containing the processing for achieving the functions of the video output device 1 is stored in a storage unit of the computer, and the functions are achieved by the central processing unit (CPU) of the computer reading and executing the program.

In the present embodiment, processing transitions to steps S2 and S3 upon receipt of a request for video transmission from the client terminal 2 in step S1, yet processing may transition to steps S2 and S3 without receipt of a request for video transmission from the client terminal 2.

For example, steps S2 and S3 may be performed in advance before receiving a request for video transmission from the client terminal 2, and processing may transition to step S4 upon receipt of a request for video transmission from the client terminal 2. In other words, in the present embodiment, the time required to process the first drawing data can be saved by generating the first drawing data in the video output device 1 in advance, thus allowing for drawing processing to be performed even faster.

Although the present invention has been described by way of drawings and an embodiment, it is to be noted that various changes and modifications will be apparent to those skilled in the art based on the present disclosure. Therefore, such changes and modifications are to be understood as included within the scope of the present invention. For example, the functions and the like included in the various means, steps, and the like may be reordered in any logically consistent way. Furthermore, means, steps, and the like may be combined into one or divided.

REFERENCE SIGNS LIST

1: Video output device (server)
2: Client terminal
11: Communication unit
12: Storage unit
13: Control unit
14: Output unit
121: First drawing instruction data
122: Second drawing instruction data
123: Uniform Function table

The invention claimed is:

1. A video output device comprising:
a memory; and
a processor that is coupled to the memory and programmed to:
   separate out shared drawing data by storing, in the memory, image data generated in advance pertaining to a shared drawing portion that is shared in common by at least two video frames among a plurality of video frames;
   for each video frame of the at least two video frames:
      (A) determine, using an index that associates variables with video frame numbers, a variable used for non-shared drawing data for drawing a non-shared drawing portion of the respective video frame;
      (B) generate, using the determined variable, the non-shared drawing data of the respective video frame; and
      (C) generate combined drawing data of the respective video frame by combining the stored image data with the generated non-shared drawing data of the respective frame; and
   output video based on the combined drawing data of each of the at least two video frames.

2. The video output device according to claim 1, wherein the processor is further programmed to generate the image data based on drawing instruction data, before the storing of the image data.

3. The video output device according to claim 2, wherein the drawing instruction data and the non-shared drawing data are each based on Canvas specifications.

4. The video output device according to claim 1, wherein the processor is programmed to generate the non-shared drawing data based on drawing instructions that draw the non-shared drawing portion using the determined variable, which changes based on different video frame numbers.

5. The video output device according to claim 1, wherein the non-shared drawing portion includes at least a part of a line drawing.

6. A video output method comprising the steps of:
separating out shared drawing data by storing in a memory, by a processor, image data generated in advance pertaining to a shared drawing portion that is shared in common by at least two video frames among a plurality of video frames;
for each video frame of the at least two video frames:
   (A) determining, by the processor, using an index that associates variables with video frame numbers, a variable used for non-shared drawing data for drawing a non-shared drawing portion of the respective video frame;

(B) generating, by the processor, using the determined variable, the non-shared drawing data of the respective video frame; and (C) generating, by the processor, combined drawing data of the respective video frame by combining the stored image data with the generated non-shared drawing data of the respective video frame; and outputting, by the processor, video based on the combined drawing data of each of the at least two video frames.

7. The video output method according to claim 6, wherein the image data is generated based on drawing instruction data, before the storing of the image data.

8. The video output method according to claim 7, wherein the drawing instruction data and the non-shared drawing data are each based on Canvas specifications.

9. The video output method according to claim 6, wherein
the non-shared drawing data is generated based on drawing instructions that draw the non-shared drawing portion, and
the drawing instructions include the determined variable, which changes based on different video frame numbers.

10. The video output method according to claim 6, wherein the non-shared drawing portion includes at least a part of a line drawing.

11. A non-transitory computer readable recording medium having stored thereon instructions for causing a computer to function as a video output device that outputs video, the instructions, when executed by the computer, causing the computer to execute the steps of:

separating out shared drawing data by storing, in a memory, image data generated in advance pertaining to a shared drawing portion that is shared in common by at least two video frames among a plurality of video frames;

for each video frame of the at least two video frames:

(A) determining, using an index that associates variables with video frame numbers, a variable used for non-shared drawing data for drawing a non-shared drawing portion of the respective video frame;

(B) generating, using the determined variable, the non-shared drawing data of the respective video frame; and (C) generating combined drawing data of the respective video frame by combining the stored image data with the generated non-shared drawing data of the respective video frame; and outputting video based on the combined drawing data of each of the at least two video frames.

12. The non-transitory computer readable recording medium according to claim 11, wherein the image data is generated based on drawing instruction data, before the storing of the image data.

13. The non-transitory computer readable recording medium according to claim 12, wherein the drawing instruction data and the non-shared drawing data are data each based on Canvas specifications.

14. The non-transitory computer readable recording medium according to claim 11, wherein
the non-shared drawing data is generated based on drawing instructions that draw the non-shared drawing portion, and
the drawing instructions include the determined variable, which changes based on different video frame numbers.

15. The non-transitory computer readable recording medium according to claim 11, wherein the non-shared drawing portion includes at least a part of a line drawing.

* * * * *